US007648034B2

(12) United States Patent  
Charkoudian et al.

(10) Patent No.: US 7,648,034 B2  
(45) Date of Patent: *Jan. 19, 2010

(54) COATED MEMBRANES AND OTHER ARTICLES

(75) Inventors: John Charkoudian, Carlisle, MA (US); Neil P. Soice, Merrimack, NH (US)

(73) Assignee: Millipore Corporation, Bedford, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/133,015

(22) Filed: Apr. 26, 2002

(65) Prior Publication Data

US 2003/0077435 A1    Apr. 24, 2003

Related U.S. Application Data

(60) Provisional application No. 60/287,172, filed on Apr. 27, 2001.

(51) Int. Cl.
- *B01D 71/06* (2006.01)
- *B01D 21/46* (2006.01)
- *B01D 71/34* (2006.01)
- *B01D 71/42* (2006.01)
- *B01D 71/40* (2006.01)

(52) U.S. Cl. ............. 210/490; 210/500.27; 210/500.35; 210/500.38; 210/500.43; 428/319.3; 428/319.7

(58) Field of Classification Search ............. 428/304.4, 428/308.4, 319.3, 319.7; 210/490, 500.42, 210/500.38, 500.35, 500.43, 500.27
See application file for complete search history.

(56) References Cited

U.S. PATENT DOCUMENTS

| | | | | |
|---|---|---|---|---|
| 3,770,454 A | * | 11/1973 | Stone | 426/12 |
| 3,941,718 A | * | 3/1976 | Barabas et al. | 502/62 |
| 3,985,840 A | | 10/1976 | Hofacker | 264/4 |
| 4,309,996 A | * | 1/1982 | Theeuwes | 604/892.1 |
| 4,470,859 A | | 9/1984 | Benezra et al. | 156/155 |
| 4,618,533 A | | 10/1986 | Steuck | 428/315 |
| 4,678,813 A | | 7/1987 | Itoh et al. | 521/61 |
| 4,695,592 A | * | 9/1987 | Itoh et al. | 521/54 |
| 4,906,374 A | | 3/1990 | Gsell | 210/490 |
| 4,944,879 A | | 7/1990 | Steuck | 210/500.27 |
| 4,968,533 A | | 11/1990 | Gsell | 427/245 |

(Continued)

FOREIGN PATENT DOCUMENTS

| | | |
|---|---|---|
| EP | 0 402 993 | 12/1990 |
| EP | 0 475 807 A2 | 3/1992 |
| EP | 1 163 044 B1 | 7/2004 |
| JP | 63-190602 | 8/1988 |
| WO | WO 99/38897 | 8/1999 |
| WO | WO 00/50160 | 8/2000 |

OTHER PUBLICATIONS

Chapman, R.G. et al., "Surveying for surfaces that resist the adsorption of proteins", *J. Am. Chem. Soc.*, 2000, 122, 8303-8304.

(Continued)

*Primary Examiner*—Hai Vo  
(74) *Attorney, Agent, or Firm*—Woodcock Washburn LLP

(57) ABSTRACT

The present invention provides porous media or membranes having a surface coating that includes a cross-linked terpolymer which has a superior combination of properties, including heat stable biomolecule resistant adsorptive properties, resistance to strong alkaline solutions, and low levels of extractable matter. In some preferred embodiments, the porous media is a porous membrane.

26 Claims, 4 Drawing Sheets

Membrane cleanliness comparison

U.S. PATENT DOCUMENTS

| | | | | |
|---|---|---|---|---|
| 5,019,260 | A | | 5/1991 | Gsell et al. ............... 210/490 |
| 5,039,421 | A | * | 8/1991 | Linder et al. ............... 210/651 |
| 5,209,849 | A | * | 5/1993 | Hu et al. .................... 210/490 |
| 5,290,548 | A | | 3/1994 | Goldberg et al. ......... 424/78.18 |
| 5,543,054 | A | | 8/1996 | Charkoudian et al. ...... 210/638 |
| 5,547,575 | A | | 8/1996 | Demmer et al. ............ 210/490 |
| 5,863,650 | A | * | 1/1999 | Healy et al. ................ 428/336 |
| 5,928,792 | A | | 7/1999 | Moya ......................... 428/422 |
| 5,929,214 | A | | 7/1999 | Peters et al. ............... 530/417 |
| 6,045,694 | A | | 4/2000 | Wang et al. ........... 210/500.37 |
| 6,107,365 | A | | 8/2000 | Bertozzi et al. ............ 523/106 |
| 6,299,773 | B1 | * | 10/2001 | Takamura et al. ...... 210/500.23 |
| 6,484,887 | B1 | * | 11/2002 | Fukutomi et al. .......... 210/488 |
| 6,486,354 | B1 | * | 11/2002 | Gani et al. .................. 568/33 |
| 6,849,185 | B1 | * | 2/2005 | Wu et al. .................... 210/660 |

OTHER PUBLICATIONS

Chapman, R.G. et al., "Polymeric thin films that resist the adsorption of proteins and the adhesion of bacteria", *Langmuir*, 2001, 17, 1225-1233.

Iwata, H. et al., "Preparation of temperature-sensitive membranes by graft polymerization onto a porous membrane", *J. Membrane Sci.*, 1991, 55, 119-130.

Ostuni, E. et al., "A Survey of Structure-Property Relationships of Surfaces that Resist the Adsorption of Protein", *Langmuir*, 2001, 17, 5605-5620.

Ostuni, E. et al., "Self-Assembled Monolayers That Resist the Adsorption of Proteins and the Adhesion of Bacterial and Mammalian Cells", *Langmuir*, 2001, 17, 6336-6343.

Lubrizol HMDAA Monomer, *HMDAA Monomer*, 22 pages.

PCT Invitation To Pay Additional Fees dated Jul. 18, 2002 (PCT/US02/13233).

PCT International Search Report dated Aug. 26, 2002 (PCT/US02/13194).

* cited by examiner

Stepwise Substitution of DACAm with HMDAA

Stepwise Substitution of MBAM with HMDAA

COATED MEMBRANES AND OTHER ARTICLES

CROSS REFERENCE TO RELATED APPLICATIONS

This application claims priority benefit of U.S. Provisional Application Ser. No. 60/287,172 filed Apr. 27, 2001, the contents of which are incorporated herein by reference.

FIELD OF THE INVENTION

The present invention relates to the field of porous media having a bulk matrix of a first material and a surface coating of a second material. The surface coating comprises a crosslinked terpolymer which has a superior combination of properties, including heat stable biomolecule resistant adsorptive properties, resistance to strong alkaline solutions, and low levels of extractable matter. In some preferred embodiments, the porous media is a porous membrane.

BACKGROUND OF THE INVENTION

Porous media are useful in many separation and adsorption technologies, such as chromatography. One particular type of porous media, porous membranes, are used for a variety of applications. Porous membranes have a first porous surface, a second porous surface, and a continuous porous structure that extends throughout the membrane from the first to the second surface. The continuous porous structure includes the bulk material matrix and the network of pores. The interface separating the bulk matrix from the pore volume (i.e., the surface of the interior pore network) is known as the interstitial surface.

Porous membranes can be classified as "microporous" membranes or "ultrafiltration" membranes on the basis of the size of the pores of the membrane. Generally, the range of pore sizes for microporous membranes is considered to be from approximately 0.05 micron to approximately 10.0 microns, whereas the range of pore sizes for ultrafiltration membranes is considered to be from approximately 0.002 micron to about 0.05 micron. These pore sizes refer to pore diameter for circular or approximately circular pores, or to a characteristic dimension for non-circular pores.

The pore size of a membrane can be denominated by the size of the smallest species (particle or molecule) that cannot pass through the membrane above a specified fractional passage. A common rating is below 10% passage, which corresponds to a 90% cutoff or retention. Other methods are known to those skilled in the art, including image analysis of scanning electron microscopy to obtain pore size distribution characteristics. Microporous membranes are typically used to remove particulates from liquids and gases. An important application of microporous membranes is in sterile filtration of pharmaceutical solutions to remove any bacteria that may be present in the solution. Microporous membranes are also used as sterile gas vents, which allow gas flow but prevent airborne bacteria from passing through the filter. Ultrafiltration membranes are generally used in applications where retention of smaller species is desired. For example, ultrafiltration membranes are used in the biotechnology industry to concentrate proteins, and in diafiltration applications to remove salts and low molecular weight species from protein solutions. Both ultrafiltration and microporous membranes can be fabricated in several forms, including sheets, tubes, and hollow fibers.

Porous membranes are made from a variety of materials, polymers being the most common. Many commercial membranes are made from engineering plastics, such as polyethersulfone, polysulfone, polyvinylidene fluoride, polyethylene, polytetrafluoroethylene, polypropylene and so forth, to take advantage of their robust thermal, mechanical, and chemical-resistance properties. Unfortunately, these materials are hydrophobic and have a high propensity to adsorb biomolecules.

In general, a hydrophilic membrane is preferred for filtration of aqueous solutions. This is because with hydrophobic membranes, contact with a low surface tension prewetting liquid followed by water exchange is required to start permeation. This not only introduces added material cost to the process, but any wetting liquid must be exhaustively flushed, which greatly increases process time and cost.

In addition to permeability and retentive properties, porous membranes have other requirements that are dictated by the nature of the application. For example, they must have sufficient mechanical strength to withstand operating pressures and temperatures. In applications where cleanliness is a major requirement, as in the pharmaceutical or microelectronics wafer-making industry, the amount of material that extracts from the membrane in use must be very small. In applications where the membrane comes in contact with biomolecules, the membrane surface must be resistant to biomolecule adsorption. A biomolecule resistant surface is a surface that adsorbs or binds minimal amounts of biomolecules, such as proteins and nucleic acids; specifically, a surface that adsorbs less than about 30 micrograms of IgG per square centimeter of membrane area as measured by the IgG binding test described herein. It is greatly preferred that a membrane surface be maximally biomolecule resistant, to reduce permeation loss from fouling by surface adsorption or pore blockage, and to prevent product loss by irreversible adsorption or associated biomolecule denaturization.

In many applications, porous membranes comes in contact with highly alkaline solutions in cleaning or sanitation operations. Thus, the membrane must have sufficient chemical resistance to withstand such contact without loss of filtration properties or desirable surface properties.

To impart the aforementioned properties to porous media or membranes, manufacturers typically modify the membrane surface (i.e., the first and second surfaces and the interstitial surface) of the bulk matrix material making up the porous media or membrane to make the surface hydrophilic and biomolecule resistant. This is done by a variety of procedures that coat, attach to, or otherwise cover the surface of the bulk matrix material with a hydrophilic polymer or group. While such modification can solve some problems related to the hydrophobic or high biomolecule binding of the bulk matrix material surface, it also can add other problems. For example, such modifications increase the amount of material able to be extracted from the membrane during use, and the modification material can have low tolerance to exposure to alkaline solutions. In addition, in many applications membranes are heated, either by wet heat as in autoclaving or steam sanitization, or by dry heat, as in a drying step. It has been observed that such heating will reduce hydrophilicity and decrease biomolecule resistance of some modified surfaces.

Some membranes of the prior art are made by modifying the surface of preformed porous membranes with crosslinked hydroxyacrylates, where the crosslinking monomer is a difunctional acrylate ("Case A membranes"). Such membranes have excellent resistance to biomolecule adsorption, excellent heat stability of the biomolecule resistance, and acceptable flow loss (i.e., the reduction in flow or permeability compared to the unmodified membrane). However, while these membranes have acceptable cleanability characteristics (i.e., the ability to clean the membrane by washing such that residual extractable matter ("extractables") is lowered to an acceptable level, it was found that to lower extractables to below a certain level, about 2 microgram per square centimeter using the TOC test (described herein in the "Methods" section), a very extensive extraction regime was needed. In addition, these membranes were sensitive to strong alkaline solutions.

Much of the prior art describes the use of hydroxyl containing monomers, usually carbonyl ester containing acrylate polymers, to produce membrane surface modifications having hydrophilic character and high resistance to protein binding. However, it is known that polymers from such monomers are not resistant to strong alkaline solutions. For example, a solution of 1.0 normal sodium hydroxide will hydrolyze the carbonyl containing acrylate polymers to acrylic acid containing polymers. Such acrylic acid containing polymers are ionically charged under certain pH conditions, and will attract and bind oppositely charged proteins or biomolecules, thus increasing sorption and membrane fouling. In addition, acrylic acid containing polymers swell in water such that they constrict pore passages, thus reducing membrane permeability and productivity. Moreover, polymers from hydroxyl containing monomers, such as hydroxy acrylates, further react in strong alkaline solutions and degrade into soluble low molecular weight fragments, which dissolve away and expose the underlying porous media or membrane.

Various methods of modifying porous membranes are known in the art. For example, U.S. Pat. No. 4,618,533 discloses and claims a composite porous thermoplastic membrane which comprises a porous membrane substrate having an average pore size between about 0.001 and 10 microns formed of a first polymer, the substrate being directly coated on its entire surface with a cross-linked second polymer formed from a monomer polymerized in situ with a free radical initiator on the substrate, where the composite porous membrane has essentially the same porous configuration as the membrane substrate.

U.S. Pat. No. 4,944,879 discloses a composite porous membrane having desired bulk properties on which is coated a cross-linked polymer having desired surface priorities. The cross-linked surface polymer is produced from a crosslinkable monomer or polymer by energy from an electron beam in the absence of a chemical polymerization initiator.

Similar modified porous media are disclosed in U.S. Pat. Nos. 4,906,374, 4,968,533, and 5,019,260, in which hydroxyl containing polymeric material is derived from monomers having hydroxyl groups and moieties characterized by having one polymerizable unit of unsaturation, such as hydroxy or hydroxy-forming substituted acrylates or methacrylate esters. Polymers from such monomers are known to lack resistance to degradation by strong alkaline solutions.

Chapman et al (J. Am. Chem. Soc. 2000, 122, 8303-8304) describe the use of self assembled monolayers (SAM) to screen functional groups for protein resistance. They report several functional groups to be protein resistant, including N-substituted amide functionalities.

U.S. Pat. Nos. 4,695,592 and 4,678,813 describe a process and product for a hydrophilized porous polyolefin membrane with a crosslinked polymer, which is composed of 50% or more of diacetone acrylamide monomer.

Iwata et al (J. Membrane Sci. 1991 55 119-130) report acrylamide coatings of membranes that have temperature responsive properties (TRP), specifically polyacrylamides, and particularly poly(N-isopropylacrylamide (polyIPAA)). Iwata report the graft polymerization of homopolymers of polyIPAA and copolymers with acrylamide to a first surface of a PVDF membrane. However, they do not cross-link the polymers, as that would impede the polymer TRP.

U.S. Pat. No. 5,929,214 to Peters et al, describes porous monoliths functionalized and/or grafted with TRP polymers, including non-crosslinked copolymers of polyIPAA. These membranes are designed to adsorb biomolecules, and the Peters et al. patent does not teach the production of protein or biomolecule resistant surfaces.

It can be seen that practitioners attempting to develop optimized membranes for sterile filtration and other applications in the pharmaceutical and biotechnology industries have to overcome significant problems. Facing stringent cost, performance and safety requirements, a practitioner has to use materials and develop manufacturing methods that produce membranes with not only optimized flow and retention characteristics, but be economical to produce, meet cleanliness criteria, be stable to the various chemical environments which are commonly encountered, and be very resistant to biomolecule adsorption. Thus, it would be desirable to have a membrane modification that results in a hydrophilic, biomolecule resistant surface that is heat stable, which is resistant to degradation by alkaline solutions, and which has very low levels of material capable of being extracted therefrom. This invention is directed to these, as well as other, important ends.

SUMMARY OF THE INVENTION

This invention is directed to polymeric porous media, preferably porous membranes, that have been modified by forming in situ on the surface thereof a cross-linked polymeric terpolymer coating. In some preferred embodiments, the coated porous media or membranes have substantially the same porous character as the unmodified porous media or membrane, and also have biomolecule resistant sorptive properties, including heat resistant biomolecule resistance, chemical resistance to strong alkaline solutions, and very low levels of extractable matter. In some more preferred embodiments, the modified porous media or membrane is hydrophilic, and does not substantially change pore size as a function of temperature.

Thus, in some preferred embodiments, the present invention provides clean porous membranes comprising a porous substrate and a separately formed heat stable biomolecule resistant surface. In further preferred embodiments, the present invention provides clean porous membranes comprising a porous substrate and a separately formed caustic resistant, heat stable biomolecule resistant surface.

In some preferred embodiments, the porous support and the polymer coating are formed from different materials.

Preferably, the porous substrate is a membrane, more preferably a microporous membrane.

In further preferred embodiments, the invention provides clean, caustic resistant, porous membranes comprising a microporous membrane substrate which is preferably formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride, and a heat stable biomolecule resistant surface that is a separately formed surface coating which comprises a crosslinked terpolymer, said terpolymer comprising at least two monofunctional monomers selected from the group consisting of acrylamides, methacrylamides, and N-vinyl pyrrolidones, and at least one polyfunctional monomer selected from the group consisting of polyfunctional acrylamides, polyfunctional methacrylamides, and diacroylpiperazines.

In some more preferred embodiments, the invention provides clean, caustic resistant, porous membranes comprising a polyvinylidene difluoride microporous membrane substrate and a heat stable biomolecule resistant surface, wherein said heat stable biomolecule resistant surface is a separately formed surface coating which comprises a crosslinked terpolymer, said crosslinked terpolymer being a copolymer formed from either:

(a) methylene-bis-acrylamide, dimethylacrylamide, and diacetone acrylamide; or (b) methylene-bis-acrylamide, vinylpyrrolidone, and either of dimethylacrylamide or diacetone acrylamide.

Also provided in accordance with some preferred embodiments of the present invention are methods for the preparation of a clean, caustic resistant porous membrane, said membrane comprising a porous membrane substrate and a heat stable biomolecule resistant surface coating, said method comprising the steps of:

a. providing a porous membrane substrate;

b. optionally washing said porous membrane substrate with a wetting liquid to wet the surfaces thereof;

c. optionally washing said wet porous membrane substrate with a second wetting liquid to replace said first wetting liquid, leaving said porous membrane substrate wetted with said second liquid;

d. contacting the surfaces of said porous membrane substrate with a reactant solution containing:

(1) at least two monofunctional monomers selected from the group consisting of acrylamides, methacrylamides, and N-vinyl pyrrolidones; and (2) at least one polyfunctional monomer selected from the group consisting of polyfunctional acrylamides, polyfunctional methacrylamides and diacroylpiperazines;

said solution optionally further comprising one or more polymerization initiators;

e. polymerizing said monomers to form said heat stable biomolecule resistant surface; and f. washing said membrane.

Preferably, the sizes of the pores of the porous substrate prior to performing steps (a) through (e) are not significantly different from the sizes of said pores after performing steps (a) through (e). In some preferred embodiments, the porous membrane substrate is a microporous membrane.

In some preferred embodiments of the methods and membranes of the invention where the porous substrate is a microporous membrane, the microporous membrane is formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride, with polyvinylidene difluoride being more preferred.

In some more preferred embodiments of the methods and membranes of the invention, the crosslinked terpolymer comprises at least one monofunctional monomer that is an acrylamide, wherein the acrylamide nitrogen of said acrylamide is substituted with at least one gem dialkyl substituted carbon.

In some particularly preferred embodiments of the methods and membranes of the invention, the crosslinked terpolymer is a copolymer formed from dimethylacrylamide, diacetone acrylamide, and methylene-bis-acrylamide. In other particularly preferred embodiments, the crosslinked terpolymer is a copolymer formed from methylene-bis-acrylamide, N-vinyl pyrrolidone, and either of dimethylacrylamide or diacetone acrylamide.

In some preferred embodiments of the membranes of the invention, the heat stable biomolecule resistant surface of the membranes is a separately formed surface coating comprising a crosslinked terpolymer; the crosslinked terpolymer comprising:

at least one polyfunctional monomer selected from the group consisting of polyfunctional acrylamide monomers, polyfunctional methacrylamide monomers, and diacroylpiperazines; and at least two different monofunctional monomers selected from the group of N-vinyl pyrrolidone monomers and monomers having the general formula:

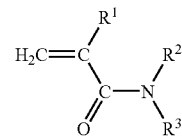

alternatively, described as $H_2C=C(R^1)C(=O)N(R^2)(R^3)$ wherein:

$R^1$ is —H or $CH_3$, $R^2$ is H or $C_1$-$C_6$, preferably $C_1$-$C_3$ alkyl, either linear or branched, $R^3$ is H or $C_1$-$C_6$, preferably $C_1$-$C_3$ alkyl, either linear or branched, or $C(CH_3)_2CH_2C(=O)CH_3$, or $(P=O)((NCH_3)_2)_2$, or $C=ON(CH_3)_2$, or $CH_2$—O—$R^4$, where $R^4$ is $C_1$-$C_5$ alkyl, either linear or branched, or $(CH_2—CH_2—O)n-R^5$, where $R^5$ is —H or —$CH_3$, and n=2 or 3; provided that $R^2$ and $R^3$ are not simultaneously H.

In some preferred embodiments of the methods and membranes of the invention, the crosslinked terpolymer of the membranes of the invention further comprises a supplemental property modifying monomer, which is preferably present in an amount that is less than either of the monofunctional monomers.

In some more preferred embodiments of the methods and membranes of the invention, the supplemental property modifying monomer is selected from the group consisting of positively or negatively charged ion containing monomers, monomers with affinity groups, or monomers with significant hydropohobic character. In further embodiments, the supplemental property modifying monomer is selected from the group consisting of (3-(methacryloylamino)propyl)trimethylammonium chloride, (3-acrylamidopropyl)trimethylammonium chloride, 2-acrylamido-2-methyl-1-propanesulfonic acid and aminopropylmethacrylamide.

In some preferred embodiments of the methods and membranes of the invention, two of the monofunctional monomers of the terpolymer are present in the weight ratio of about 1 to 5, with about 1 to 2 being more preferred.

In further preferred embodiments of the methods and membranes of the invention, the total amount of monofunctional monomers present is from about 0.5% to about 20%, with from about 2% to about 10% being more preferred, and from about 4% to about 8% being even more preferred.

In still further preferred embodiments of the methods and membranes of the invention, the ratio of the total amount of monofunctional comonomers to polyfunctional crosslinker monomer is about 1 to about 10, with about 2 to about 6 being more preferred.

In some preferred embodiments of the membranes of the invention, the heat stable biomolecule resistant surface is hydrophilic.

In some more preferred embodiments of the methods and membranes of the invention, the membranes of the invention have a biomolecule binding of less than about 30 microgram per square centimeter measured by the IgG binding test.

In further preferred embodiments, the membranes of the invention have TOC extractables of less than about 2.0 micrograms of extractable matter per square centimeter of membrane as measured by the NVR Extractables test. More preferably, the membranes of the invention have less than about 1.5, more preferably less than about 1.4, more preferably less than about 1.3, more preferably less than about 1.2, more preferably less than about 1.1, and even more preferably less than about 1.0 micrograms of extractable matter per square centimeter of membrane as measured by the NVR Extractables test.

In further more preferred embodiments of the methods and membranes of the invention, the membranes of the invention have caustic resistance of less than about 1.5, preferably less than about 1.3, more preferably less than about 1.2, and even more preferably less than about 1.0 as measured by the Flow Time Measurement test.

In further preferred embodiments, the present invention also provides methods for removing cells from a solution comprising the steps of providing a solution comprising having undesired cells; and filtering said solution through a membrane of the invention.

In still further preferred embodiments, the present invention also provides methods for sterilizing a solution comprising the steps of providing a non-sterile solution and filtering said solution through a membrane of the invention.

In further embodiments, the present invention provides membranes having a surface coating comprising at least one hydroxymethyldiacetoneacrylamide (HMDAA) monomer of formula:

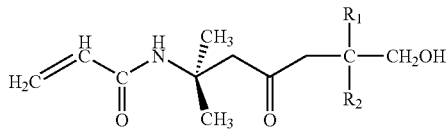

wherein $R_1$ and $R_2$ are each independently H or $CH_2OH$, preferably wherein $R_1$ and $R_2$ are each $CH_2OH$.

Also provided are methods for preparing a coated polymer membrane comprising the steps of:
a. providing a porous membrane substrate;
b. optionally washing said porous membrane substrate with a wetting liquid to wet the surfaces thereof;
c. optionally washing said wet porous membrane substrate with a second wetting liquid to replace said first wetting liquid, leaving said porous membrane substrate wetted with said second liquid;
d. contacting the surfaces of said porous membrane substrate with a solution containing:
   one or more monofunctional monomers, and
   at least one monomer hydroxymethyldiacetoneacrylamide (HMDAA) monomer of formula:

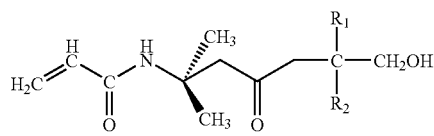

wherein $R_1$ and $R_2$ are each independently H or $CH_2OH$, preferably wherein $R_1$ and $R_2$ are each $CH_2OH$; and e. polymerizing said monomers to form said coated membrane.

DETAILED DESCRIPTION

Figure 1:
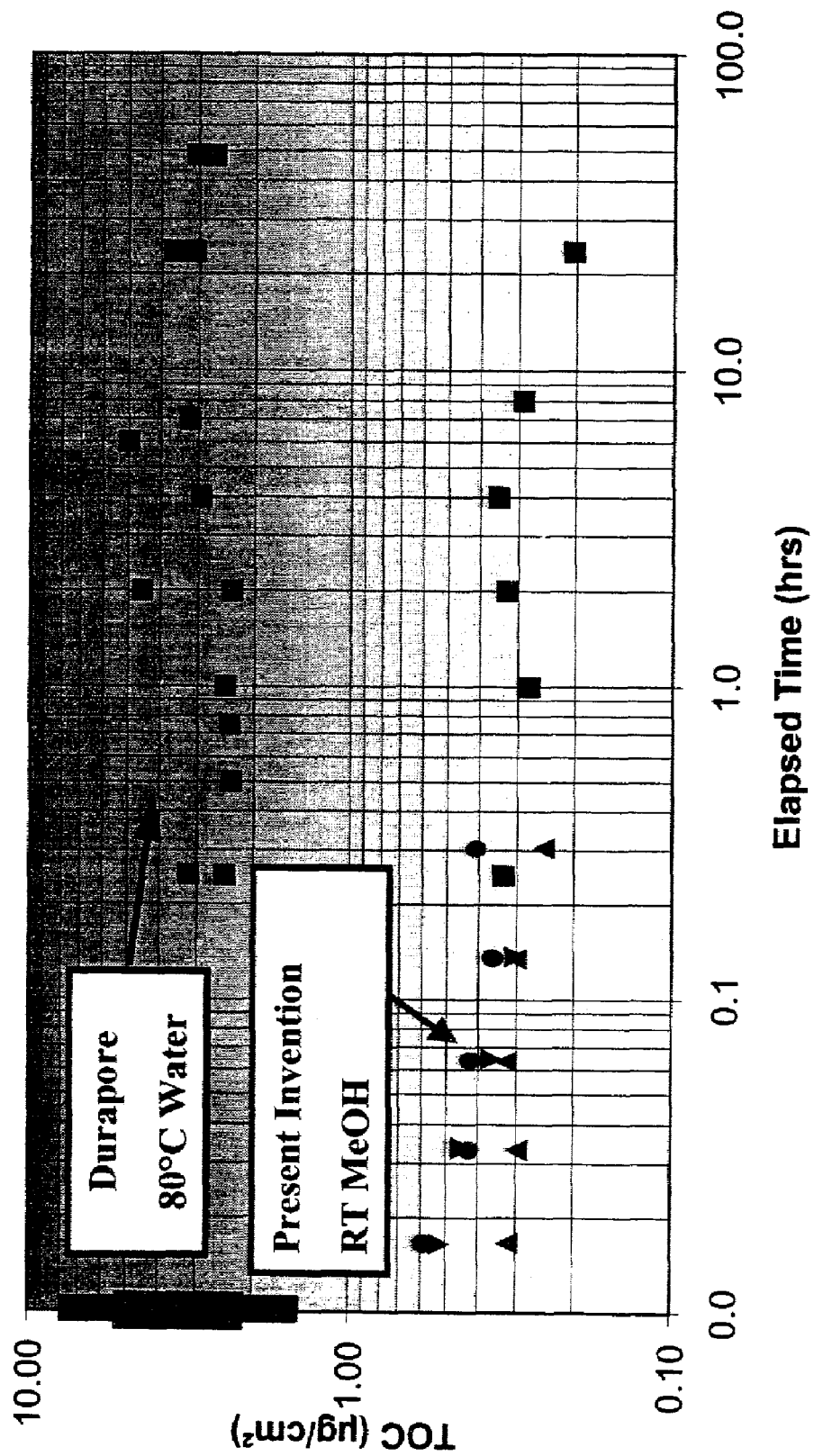
FIG. 1 shows the levels of extractable material as total organic carbon for membranes of the prior art, and of the present invention, after different soak times.

The present invention provides porous membranes, preferably porous hydrophilic membranes, which have a superior combination of desirable properties, including resistance to biomolecule adsorption (sometimes referred to as "low affinity or sorbability for biomolecules" or "biomolecule resistance"), more preferably heat stable resistance to biomolecule adsorption, chemical resistance to strong alkaline solutions such as are used to clean and/or sanitize porous membranes, and having very low levels of extractable matter than prior membranes. In accordance with the present invention, it has been discovered that polymeric porous media, preferably porous membranes useful for filtration or as a diagnostic media, can be modified by forming in situ a crosslinked terpolymer on the surface thereof to obtain a coated membrane having the aforementioned properties.

Thus, in some preferred embodiments, the present invention provides polymeric porous media, preferably a porous membrane, which has a crosslinked terpolymer surface. Preferably, the crosslinked terpolymer surface is formed in situ on the surface of the porous media or membrane. Preferably, the modified porous media or membrane does not substantially change pore size as a function of temperature.

In preferred embodiments, the present invention provides porous membranes having a heat stable biomolecule resistant surface. As used herein, the term "biomolecule" is intended to mean any organic molecule that is part of a living organism, or analogs thereof. Thus, biomolecules include polymers of amino acids, for example peptides and proteins (including antibodies and enzymes), and polymers of nucleotides such as DNA and RNA molecules, and DNA and RNA probes. Also included within the definition of biomolecules are carbohydrates and lipids. It is intended that synthetically produced analogs of each of the foregoing be included in the definition of the term "biomolecule".

As used herein, the terms "biomolecule resistant" or "biomolecule resistance" as applied to membranes or membrane surfaces of the invention mean a membrane or membrane surface that adsorbs less than about 30 micrograms of IgG per square centimeter of membrane area as measured by the IgG binding test described herein.

As used herein in connection with the membranes of the present invention, the term "heat stable" as applied to the term "biomolecule resistant surface" means a biomolecule resistant surface, for example a membrane surface, that, after exposure to heat as described herein, has less than about twice the IgG adsorption of the same surface prior to heat exposure, as measured by the IgG test described herein.

In further preferred embodiments, the invention provides clean, caustic resistant porous membranes comprising a porous substrate and a separately formed heat stable biomolecule resistant surface. Preferably, the porous substrate is a membrane, more preferably a microporous membrane.

As used herein in connection with the membranes and methods of the present invention, the term "clean membrane" means a membrane that, when produced, has either:

a. less than about 2 micrograms of extractable matter per square centimeter of membrane, and preferably less than about 1 microgram of extractable matter per square centimeter, as determined by the NVR Extraction test described herein; or b. less than about 1 microgram of extractable matter per square centimeter of membrane as determined by the TOC extractables test described herein.

As used herein, the term "caustic resistant" as applied to membranes of the invention means a membrane that remains wettable after exposure to 0.1 NaOH for two hours at ambient temperature, and has a ratio of flow times after such exposure to that before such exposure of less than about 1.5, when measured by the flow time measurement test described herein.

A wide variety of porous media are useful in the practice of the present invention. Examples of such porous media include ceramics, metals, carbon and polymers. In some preferred embodiments, the porous medium is a polymer membrane. Representative polymers that can be used to manufacture porous membranes useful in the present invention include polysulfone polymers, preferably aromatic sulfone polymers, such as polysulfone and polyethersulfone polymers, perfluorinated thermoplastic polymers including polytetrafluoroethylene and polyvinylidene difluoride, polyolefin polymers such as polyethylene, ultrahigh molecular weight polyethylene and polypropylene, and polyesters such as polyethyleneterepthalate and polycarbonate. In some particularly preferred embodiments, the porous membrane is a polyvinylidene difluoride membrane. Those skilled in the art will readily be able to identify other polymers useful in the formation of porous membranes suitable for the present invention.

In some preferred embodiments, the porous media or membrane is hydrophobic media or a hydrophobic membrane. In other preferred embodiments, the porous media or membrane is hydrophilic media or a hydrophilic membrane. In embodiments where the porous membrane is hydrophilic, polyamides, cellulose acetate and cellulose are preferred.

In some preferred embodiments, the heat stable biomolecule resistant surface is formed on a porous membrane. As used herein, the term "porous membrane" includes both microporous membranes and ultrafiltration membranes. The ultrafiltration and microporous membranes of the invention can be in any of several forms, including sheets, tubes, and hollow fibers.

As used herein, the term "surface" as applied to the surface coatings of the membranes and methods of the invention shall mean the entire surface area of a porous media or membrane, including external surfaces and the internal surface of the porous media or membrane. The term "external surface" means a surface that is exposed to view, for example either of the planar porous surfaces of sheet membranes. The term "internal surface" is intended to denote the internal surface of a porous network, i.e., the interstitial area, of a porous media or membrane.

In general, porous membranes may be skinned or unskinned. A skin is a relatively thin, dense surface layer integral with the substructure of the membrane. In skinned membranes, the major portion of resistance to flow through the membrane resides in the thin skin. In both microporous and ultrafiltration membranes, the surface skin, where present, contains pores leading from the external surface to the continuous porous structure of the membrane below the skin. For skinned microporous and ultrafiltration membranes, the pores represent a minor faction of the external surface area. In contrast, an unskinned membrane will be porous over the major portion of the external surface. The external surface porosity of the membrane (that is, the arrangement of pores of the external surface of the membrane as viewed by, for example, scanning electron microscopy; "SEM") can be single pores that are relatively evenly distributed on the external surface of the membrane, or can be discrete areas of porosity, or mixtures thereof. As used herein, the term "surface porosity" as applied to an external surface of a membrane is the ratio of the area defined by the pore openings of the external surface to the total surface area of the external surface.

Microporous membranes useful in the practice of the present invention may be classified as symmetric or asymmetric, referring to the uniformity of the pore sizes across the thickness of the membrane, or, for a hollow fiber, across the porous wall of the fiber. As used herein, the term "symmetric membrane" indicates a membrane that has substantially uniform pore size across the membrane cross-section. The term "asymmetric membrane" is intended to mean a membrane in which the average pore size is not constant across the membrane cross-section. For example, in asymmetric membranes pore sizes can vary smoothly or discontinuously as a function of location through the membrane cross-section. As will be appreciated, included within the definition of "asymmetric membranes" are membranes that have a ratio of pore sizes on one external surface to those on the opposite external surface that are substantially greater than one.

As used herein, the term "crosslinked terpolymer" means a polymer made from three or more monomers, of which at least one monomer has two or more reactive sites which can take part in a polymerization reaction, or can crosslink separate polymer chains. Terpolymers are generally considered as being made from three monomers, but in the context of the present invention, terpolymers are not limited to three monomers, as it may be desirable to use one or more additional monomers to impart or refine desired properties of the membrane. In some preferred embodiments, the crosslinked terpolymer is made from two monofunctional monomers and one difunctional monomer.

The crosslinked terpolymer preferably covers the entire surface of the porous media or membrane. In preferred embodiments, the crosslinked terpolymer is formed in situ from a solution of two or more monofunctional monomers and a crosslinking polyfunctional monomer (referred to herein as the "reactant solution"). A monofunctional monomer is one that has a single unsaturated functional group. Polyfunctional monomers are molecules which have more than one unsaturated functional group. Preferably, two or more of the monofunctional monomers are mono- or di-N-substituted acrylamides or methacrylamides. The crosslinking monomer is preferably a polyfunctional acrylamide or methacrylamide. In one particularly preferred embodiment, dimethylacrylamide and diacetone acrylamide are used with methylene-bis-acrylamide. In another particularly preferred embodiment, N-vinyl pyrrolidone is substituted for one of the mono- or di-N-substituted acrylamide or methacrylamide monofunctional monomers.

In some preferred embodiments, at least one polyfunctional monomer is a polyfunctional acrylamide monomer, a polyfunctional methacrylamide monomer, or a diacroylpiperazine, and at least two different monofunctional monomers are selected from acrylamide monomers, methacrylamide monomers, and N-vinyl pyrrolidones.

In further preferred embodiments, at least one polyfunctional monomer is a polyfunctional acrylamide monomer, a polyfunctional methacrylamide monomer, or a diacroylpiperazine, and at least two different monofunctional monomers are selected from N-vinyl pyrrolidone monomers and monomers having the general formula:

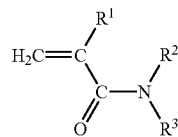

alternatively, described as $H_2C=C(R^1)C(=O)N(R^2)(R^3)$ wherein:

$R^1$ is —H or $CH_3$, $R^2$ is H or $C_1$-$C_6$, preferably $C_1$-$C_3$ alkyl, either linear or branched, $R^3$ is H or $C_1$-$C_6$, preferably $C_1$-$C_3$ alkyl, either linear or branched, or $C(CH_3)_2CH_2C(=O)CH_3$, or $(P=O)((NCH_3)_2)_2$, or $C=ON(CH_3)_2$, or $CH_2$—O—$R^4$, where $R^4$ is $C_1$-$C_5$ alkyl, either linear or branched, or $(CH_2$—$CH_2$—O)n-$R^5$, where $R^5$ is —H or —$CH_3$, and n=2 or 3; provided that $R^2$ and $R^3$ are not simultaneously H.

In some more preferred embodiments, the crosslinked terpolymer is a polymer formed from either:

(a) methylene-bis-acrylamide, dimethylacrylamide, and diacetone acrylamide; or (b) methylene-bis-acrylamide, -vinyl pyrrolidone, and either of dimethylacrylamide or diacetone acrylamide.

Also provided in accordance with some preferred embodiments of the present invention are methods for the preparation of a clean, caustic resistant porous membrane, said membrane comprising a porous membrane substrate and a heat stable biomolecule resistant surface coating, said method comprising the steps of:

a. providing a porous membrane substrate;

b. optionally washing said porous membrane substrate with a wetting liquid to wet the surfaces thereof;

c. optionally washing said wet porous membrane substrate with a second wetting liquid to replace said first wetting liquid, leaving said porous membrane substrate wetted with said second liquid;

d. contacting the surfaces of said porous membrane substrate with a solution containing:

(1) at least two monofunctional monomers selected from the group consisting of acrylamides, methacrylamides, and N-vinyl pyrrolidones; and (2) at least one polyfunctional monomer selected from the group consisting of polyfunctional acrylamides, polyfunctional methacrylamides and diacroyl piperazines;

said solution optionally further comprising one or more polymerization initiators;

e. polymerizing said monomers to form said heat stable biomolecule resistant surface; and f. washing said membrane.

In preferred embodiments, the entire surface of the porous media or membrane is coated with the terpolymer. Thus, the reactant solution should preferably wet the entire surface of the porous media or membrane. This is preferably facilitated by performing a washing step prior to contacting the porous media or membrane with the reactant solution. Thus, in some preferred embodiments, the porous media or membrane is first washed with a washing liquid which completely wets the entire porous media or membrane surface. Preferably, the washing liquid does not swell or dissolve the porous media or membrane, and also can preferably be exchanged with the reactant solution.

In some preferred embodiments where an aqueous reactant solution is employed, the wetting liquid can be an organic-water composition having lower surface tension than the surface tension required to wet the porous media or membrane. Examples of suitable wetting liquids are alcohol-water solutions, preferably methanol-water, ethanol-water, or isopropanol-water solutions.

In some preferred embodiments where a washing step is employed, it is desirable to perform a second washing step. For example, where one or more components of the wetting liquid can interfere with the polymerization or crosslinking reactions, a second washing step can be used to remove the washing liquid and replace the same with a second washing liquid that does not interfere with the polymerization or crosslinking reactions. For example, if an aqueous reactant solution is to be used, the wet porous media or substrate is washed with water to remove the first wetting liquid and produce a water filled porous media or membrane. The wet porous media or membrane is then contacted with the reactant solution (for example by soaking in the reactant solution) to produce the desired reactant composition in the pores of the porous media or membrane, and on the external surfaces thereof. Preferably, the first and second washing steps, where desired, are performed at ambient temperatures, for instance, 20° C. to 30° C., and preferably for times from a few seconds to a few minutes.

If the reactant solution wets the porous media or membrane sufficiently, due to containing an organic solvent for that purpose, or if the concentration of reactants in the reactant solution is sufficient to lower the surface tension of the solution to allow the reactant solution to fully wet the porous media or membrane, then neither of the washing steps are required. Thus, in some preferred embodiments, the reactant solution will contain one or more additives which lower the surface tension of the reactant solution sufficiently to avoid such washing steps, and which do not interfere with the subsequent polymerization reaction. Preferred examples of such additives include ethyl hexyl diol, propylene carbonate, tripropyleneglycol methyl ether and 2-methyl-2,4-pentane diol. The amount of additive to the reactant solution required to achieve proper wetting depends on the amount and type of monomers and initiators being used, and will be readily determinable by those of skill in the art without undue experimentation.

In some preferred embodiments, the reactant solution includes solvent, monofunctional monomers, at least one polyfunctional crosslinking monomer, and, optionally, one or more initiators. The choice of solvent for the reactant solution depends on the choice of monomers and optional initiators. The solvent preferably (1) dissolves the reactants and, if present, the initiator; (2) does not interfere or hinder the polymerization reaction; and (3) does not attack the porous media or membrane. One example of a particularly preferred solvent is water.

In some especially preferred embodiments of the invention, the terpolymer is formed from at least two monofunctional monomers chosen from acrylamides, methacrylamides, or N-vinyl pyrrolidones, and at least one polyfunctional acrylamide or methacrylamide crosslinking monomer. However, in other preferred embodiments, other monomers may be used. These include N-vinyl pyrrolidones, and other mono- or di-N-substituted acrylamide or methacrylamide monomers, for example those having the formula:

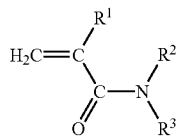

alternatively, described as $H_2C=C(R^1)C(=O)N(R^2)(R^3)$ wherein:

$R^1$ is —H or $CH_3$, $R^2$ is H or $C_1$-$C_6$, preferably $C_1$-$C_3$ alkyl, either linear or branched, $R^3$ is H or $C_1$-$C_6$, preferably $C_1$-$C_3$ alkyl, either linear or branched, or $C(CH_3)_2CH_2C(=O)CH_3$, or $(P=O)((NCH_3)_2)_2$, or $C=ON(CH_3)_2$, or $CH_2$—O—$R^4$, where $R^4$ is $C_1$-$C_5$ alkyl, either linear or branched, or $(CH_2$—$CH_2$—O)n-$R^5$, where $R^5$ is —H or —$CH_3$, and n=2 or 3; provided that $R^2$ and $R^3$ are not simultaneously H.

In some embodiments, it is preferred that the ratio of a first monofunctional comonomer to a second monofunctional comonomer be from about 1 to 5, more preferably from about 1 to 2. In further preferred embodiments, the total amount of comomomers is from about 0.5% to about 20%, more preferably between about 2% to about 10%, and still more preferably from about 45 to about 8%.

In some preferred embodiments, the terpolymer can contain one or more monofunctional monomers in addition to the two monofunctional monomers previously described. Such additional monofunctional monomers can be advantageously employed to impart or modify specific properties of the terpolymer. For example, in some embodiments where it is desirable to modify the hydrophilic nature or ionic charge content of the terpolymer, it is preferable to include a third monofunctional monomer having a different functionality from the other two monofunctional monomers to effect the modification. Preferably, where an additional monofunctional monomers or monomers are employed in the terpolymer, such additional monomers are employed in a minor amount, or an amount comparable to the monofunctional monomers. Representative additional property modifying monomers include can be(3-(methacryloylamino)propyl)-trimethylammonium chloride, (3-acrylamidopropyl)trimethylammonium chloride, 2-acrylamido-2-methyl-1-propanesulfonic acid and aminopropylmethacrylamide In preferred embodiments if the invention, the terpolymer contains at least one polyfunctional crosslinker monomer (or "crosslinking monomer"). While not wishing to be bound by a particular theory, it is believed that the crosslinking monomer facilitates a permanent modification to the porous substrate or membrane by, inter alia, both participating in the chain polymerization reactions, and by crosslinking the polymerized chains of monofunctional monomer. Examples of preferred crosslinking monomers suitable for use in the present invention include polyfunctional acrylamides, polyfunctional methacrylamides, and diacroylpiperazine, with polyfunctional acrylamides, and polyfunctional methacrylamides being more preferred. Ethylene-bis-acrylamide and methylene-bis-acrylamide are particularly preferred crosslinking monomers, with methylene-bis-acrylamide being especially preferred.

In some preferred embodiments, the ratio of amount of crosslinker monomer to the total amount of monofunctional monomers present in the terpolymer is from about 1 to about 10, more preferably from about 2 to about 6.

As used herein in reference to the monomeric components of the terpolymer, the terms "monomer" and "comonomer" shall be used interchangeably.

In some preferred embodiments, the polymerization of the monofunctional monomers and the crosslinking copolymer or copolymers of the present invention is achieved through free radical initiation and propagation. In some preferred embodiments, one or more free radical initiators can be included in the in the reactant solution containing the monomers to facilitate polymerization. Any of a wide variety of initiators known in the art will find applicability in the present invention. In some preferred embodiments the initiator or initiators are water soluble. In other preferred embodiments, for example when wetting reactant solutions are used, sparingly water soluble initiators are preferred.

Those of skill in the art will readily be able to determine suitable initiators for a given reactant solution. Examples of suitable initiators include, for example, ammonium persulfate, potassium persulfate, azobis(4-cyanovaleric acid, Irgacure2959 (Ciba-geigy, Hawthorn, N.Y.), 2,2'-azobis(2-amidino-propane)hydrochloride and the like. Preferably, the initiator or initiators are used in the range of from about 0.1% to about 1% by weight, based on the total reactant solution.

In preferred embodiments, after the surface of the porous media or membrane is contacted with (i.e., is saturated with) the reactant solution, excess reactant solution removed from the external surfaces, while still leaving such external surfaces wetted with solution. For small sheets, excess reactant solution can be removed by, for example, placing the saturated sheet between two layers of plastic film and rolling out excess liquid with a rubber roll, such as. for example, a hand brayer. In processing continuous sheets of porous media or membranes, removal of excess liquid can be performed with air knives, which direct a stream of air at the external surfaces. The force of the air stream sweeps away the excess reactant solution. One preferred technique is to run the sheet between two pressure controlled contacting rolls, at least one of which is elastomer coated, which rotate in the same direction as the sheet. The amount of liquid left in the sheet can be accurately controlled by adjusting the pressure of the contacting rolls.

After the excess reactant solution is removed, polymerization of the reactant solution is then begun by exposing the wet porous media or membrane to any conventional energy source, such as heating, ultraviolet light, electron beam or gamma radiation. Free radical polymerization initiated by heat is typically achieved by heating the saturated media or membrane to at least about 60° C. and maintaining that temperature for from about 0.1 to about 10 minutes, preferably between about 1 to about 2 minutes. Higher temperatures can be used depending on the combination of initiator and monomers used, up to the point where boiling or too rapid vaporization adversely affects the polymerization reaction.

In some preferred embodiments, ultraviolet light is used to initiate the in situ polymerization reaction. Preferably, the porous media or membrane saturated with the reactant solution (which optionally contains one or more initiators) is illuminated with an ultraviolet light source such as Fusion Systems F600 (Rockville, Md.) with an "H" bulb. Filters can be used to reduce or remove undesirable wavelengths which may cause unwanted damage to the porous media or membrane being modified. Those of skill in the art will appreciate that the balance of exposure time to the UV lights with lamp intensity to optimize polymerization conditions will be a matter of routine experimentation. Generally, with a 600 watt source, exposure times of from about 2 seconds to about 10 seconds, preferably from about 3 seconds to about 5 seconds, will be suitable.

In some preferred embodiments, electron beam technology is used to initiate polymerization, for example by methods described in U.S. Pat. No. 4,944,879, the disclosure of which is incorporated herein by reference. Typically, a web or individual sample is passed through a curtain of electrons generated by an electron beam processor. The processor delivers the desired dose at from about 100 kV to about 200 kV. The moving web or sample is transported at a speed suitable to give the desired exposure time under the curtain. Exposure time, combined with dose, determines the dose rate. Typical exposure times are from about 0.5 seconds to about 10 seconds. Dose rates generally are from 0.05 kGy (kiloGray) to about 5 kGy.

It is known that the presence of molecular oxygen adversely affects free radical polymerization reactions. Thus, in each of the foregoing methods of initiation previously described, it is preferred that the amount of oxygen in the reaction zone be controlled to levels below about 200 ppm, preferably below about 50 ppm. In some preferred embodiments, this is accomplished by flooding the reaction zone with inert gas such as nitrogen or argon, or by sandwiching the sheet between two layers of plastic film to exclude air.

In further preferred embodiments, the polymerization of the monomers of the reactant solution can be initiated by gamma irradiation. Typically, in this method, a wound roll of monomer saturated porous membrane is irradiated. The roll can be passed through the reactant solution and rolled up, or a previously wound up roll can be immersed in the reactant solution. Preferably, the reactant solution is degassed, that is, treated so as to remove air, and particularly oxygen, from the solution. In some preferred embodiments, degassing is accomplished by replacing air with an inert gas such as helium, nitrogen or argon. In other preferred embodiments, degassing is accomplished by reducing the pressure over the monomer solution, for example with a vacuum pump. The degassed monomer solution laden roll is then sealed with a sealing material so as to remain in a degassed state, and then irradiated at the desired dose. Preferably, the sealing material will not be degraded by the irradiation, and also does not significantly retard the gamma rays. A wide variety of materials are known in the art to be useful as sealing materials, for example many plastics, and borosilicate glass.

Typically, total dosages of about 0.02 to about 1.0 kGy are suitable. Typical exposures of about 5 to about 500 kilorads per hour, more preferably about 5 to about 150 kilorads per hour can be used, with typical irradiation times of from about 4 to about 60 hours. Those of skill in the art will readily be able to determine the proper balance of dose rate and time to arrive at the total dosage.

The degree to which the crosslinked terpolymer is grafted (i.e., the degree to which the terpolymer is bound) to the porous media or membrane can be controlled by, inter alia, the choice of method of initiation the polymerization reaction. For example, gamma irradiation gives a greater degree of grafting of the copolymer to a polymeric bulk matrix, while heat induced initiation will have a lesser degree of grafting. Those of skill in the art will readily be able to select the initiation method that will give the desired degree of grafting of terpolymer to the porous media or membrane.

The methods of the invention are applicable to the fabrication of sheet, tube and hollow fiber membranes. Coating methods are known from the textile fiber and monofilament industries which can be adapted to this process.

In some embodiments, the present invention provides membranes and articles comprising polymer membranes, wherein the membranes include a surface coating which comprises at least one hydroxymethyldiacetoneacrylamide (HMDAA) monomer of formula:

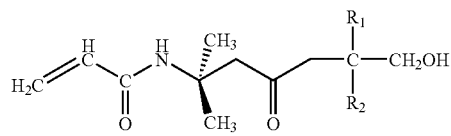

wherein $R_1$ and $R_2$ are each independently H or $CH_2OH$. In some preferred embodiments, $R_1$ and $R_2$ are each $CH_2OH$. HMDAA is available from Aldrich Chem. Co., St. Louis. Mo.

Membrane coatings incorporating HMDAA can be prepared by the methods described herein, as well as other methods known in the art for the preparation of coated polymer membranes. For example, any of the many crosslinking monomers, for example methylenebisacrylamide (MBAm) can be partially or completely replaced by HMDAA in coating regimes.

Typically, HMDAA is employed in sufficient amount to effect crosslinking of the polymer coating. In some embodiments, the molar ratio of total monofunctional monomer in the surface coating to HMDAA is 10:1. In some more preferred embodiments, the ratio is from 7:1 to 3:1. In some preferred embodiments, the ratio is 4:1, 5:1, or 6:1.

In addition to the novel coated membranes described herein, any of a variety of polymer membranes known in the art can be coated with a polymer including HMDAA as a crosslinking monomer. Representative membranes that can be modified by surface coatings incorporating the HMDAA monomers include all those described in this specification, and especially, and without limitation, polysulfone polymers, preferably aromatic sulfone polymers, such as polysulfone and polyethersulfone polymers, perfluorinated thermoplastic polymers including polytetrafluoroethylene and polyvinylidene difluoride, polyolefin polymers such as polyethylene, ultrahigh molecular weight polyethylene and polypropylene, and polyesters such as polyethyleneterepthalate, polycarbonate, plasticized and nonplasticized polyvinyl chloride, and other thermoplastic polymers.

In some preferred embodiments, one or more HMDAA crosslinking monomers are completely or partially substituted for methylenebisacrylamide as the crosslinking monomer in each of the novel crosslinked terploymer surface coated membranes described herein.

In some embodiments, HMDAA can be the sole crosslinking monomer of the surface coating, and in other embodiments HMDAA is employed with one or more additional crosslinking monomers.

While not wishing to be bound by any particular theory, it is believed that when HMDAA (particularly wherein $R_1$ and $R_2$ are each $CH_2OH$) is heated, a vinyl ketone is generated at the end of the HMDAA molecule opposite from the acrylamide portion thereof, providing a difunctional acrylamide-vinyl ketone crosslinking monomer. HMDAA is further described in, for example, the publication "HMDAA Monomer", published by Lubrizol Chemical Co., incorporated herein by reference.

The HMDAA crosslinked surface coated membranes of the invention possess advantages compared to other surface coated membranes prepared using other crosslinking monomers. For example, it is believed that pendant —$CH_2OH$ groups of the HMDAA monomers can persist after the crosslinking reaction. These residual hydroxymethyl residues can advantageously be employed as nucleophilic sites, which serve as post-coating formation points of attachment for incorporation of a variety of functional moieties into the coating. For example, such functional moieties can be attached to the coating via tethers having electrophilic moieties which can react with the HMDAA hydroxymethyl residues. Such electrophilic moieties include, for example, glycidyl groups, α-ketomethylene groups, and isocyanates. Representative functional moieties which can be attached by the tethers include charged moieties such as quaternary ammonium species, sulfonic acids, and other charged groups useful for imparting charge to the membrane coating.

It is further believed that membranes employing surface coatings including the HMDAA crosslinking monomers possess additional advantages. For example, the crosslinking monomer methylenebisacrylamide, while suitable for surface coatings as described herein, is believed in some instances to result in increased protein binding and lower wettability relative to other polymer constituents, and increased brittleness. In contrast, the HMDAA crosslinking monomer is not believed to impart such properties.

It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

Methods

1. Biomolecule Resistance

Biomolecule resistance to adsorption of porous membranes is measured by a static soak test using IgG protein. The protein solution is prepared with phosphate buffered saline (PBS), purchased from Sigma Chemical Company, St. Louis. Mo. (Sigma I-5523). Goat gamma globulin, also obtained from Sigma Chemical Company (Sigma I-5523) is used at a concentration of 1 mg/ml. $^{125}$I-goat anti(rabbit IgG) is purchased from NEN Life Science Products Boston, Mass. (NEX-155) and added to the protein solution to reach a final concentration of 0.1 µCi/ml.

One 13 mm membrane disk is placed in a 16×100 mm test tube and exactly 1 ml of protein solution is added with a calibrated micropipettor. All test tubes are placed in a rack on a rotary shaker table and agitated for two hours. After agitation, the fluid is aspirated from the test tubes and the wet membrane is washed three times with 1 ml PBS. The washed membrane disk is transferred to a clean test tube and placed into a gamma counter (Minaxi Auto-gamma 5000 series from Packard Instrument Company, Downers Grove, Ill.) to determine the radioactivity bound on each disk, in units of counts per minute (cpm). Counts per minute for control tubes with 1 ml of protein solution and no membrane are also determined. Based on the control tubes, the relation between measured radioactivity and actual protein concentration is calculated for the amount of protein on each disk by the following equation:

Control relation=total mean cpm/mg IgG=total mean cpm/1000 µg IgG

Because the radioactivity found on each disk is measured, the amount of protein on each disk can be calculated through the following equation:

Protein bound in one 13 mm disk=(cpm/1.33 cm$^2$)* (1000 µg IgG/total mean cpm)

This quantity is reported as protein bound in units of µg per cm$^2$ of frontal membrane area (a 13 mm disk has an area of 1.33 cm$^2$). At least duplicates are run for each sample tested.

Typical values found for low-binding commercial PVDF membranes, such as Durapore® membranes, are in the 15±4 µg/cm$^2$ range. In contrast, competitive PVDF membranes, such as Fluorodyne® membranes from Pall corporation, are in the 47±19 µg/cm$^2$ range.

2. Heat Stability of Biomolecule Resistance

To determine the heat stability of the biomolecule resistance of membranes, samples of membranes were either (1) heated to 135° C. for two hours in an oven; or (2) held in a 121° C. steam autoclave for one hour, and then tested as described above.

3. TOC (Total Organic Carbon) Method for Determining Extractables Level

Three 47 mm disks of membrane are cut and placed in a pre-cleaned 40 ml TOC vial. The vial is covered by GVX (hydrophobic PVDF) and is secured by a rubber band. The vial is then autoclaved at 126° C. for 1 hour. After cooling the vial is removed. The GVX is removed and 40.0 ml of fresh MilliQ® water is added, and the vial immediately capped with its pre-cleaned, Teflon lined septum cap. The membranes are allowed to extract overnight (minimum 16 hrs). The extracts are then analyzed for TOC levels by a Sievers 800 TOC analyzer. The raw PPM results are corrected for the blank, which is an empty vial that was also autoclaved and extracted overnight. These ppm TOC results are converted to µg C per cm$^2$ by multiplying by 40 ml and dividing by 52.05 cm$^2$.

4. TOC/NVR (Total Organic Carbon/Non-Volatile Residue) Method for Determining Extractables Level for Production Scale Membranes Approximately 8 ft$^2$ of membrane is coiled and then wrapped in GVX. The sample is then autoclaved at 126° C. for 1 hour. After cooling the membrane is removed from the GVX and added to 800 ml of fresh MilliQ® water in a pre-cleaned 1 L graduated cylinder such that the membrane is completely submerged. The cylinder is capped with a layer of aluminum foil and the membrane is allow to extract overnight (minimum 16 hours). The membrane is then removed. Aliquots of the extracts are then analyzed for TOC (40 ml) and NVR (200-600 ml) by standard methods. The results are corrected for blanks and reported as µg C per cm2 and mg NVR per 7.5 ft$^2$ respectively.

5. Flow Time Measurement to Determine Caustic Resistance

In this test modified membranes are tested for Flow Time, which is a method to measure permeability, exposed to 0.1 NaOH for two hours at ambient temperature and re-tested for Flow Time. The ratio of Flow Times after to before exposure is a measure of the effect of caustic on the membrane. A higher ratio shows more effect. A ratio of 1 shows no effect. A caustic resistant membrane is one that remains wettable after this exposure and has a ratio of flow times after exposure to that before exposure of less than about 1.5.

The following procedure is employed for this test:

1. Membranes are cut into 47 mm disks.
2. The disks are wetted out with water and placed in a filter holder with a reservoir for holding a volume of water and attached to a vacuum pump.
3. Water is flowed through the membrane under 27.5 inches Hg differential pressure.
4. After equilibrium was achieved, the time for 500 ml of water to flow through the membrane is recorded.

5. This measurement is made before and after exposure to 0.1M NaOH for two hours at ambient temperature. Exposure to 0.1M NaOH is performed by swirling the disks in a large excess of base, and washing the membranes with water to neutrality before the flux measurement.

6. Data are rounded off the ratios to the nearest whole number.

EXAMPLE 1

Modification and Evaluation of PVDF Microporous Membranes by Methods of the Invention Six 47mm disks of the hydrophobic PVDF membrane of 0.1 micron rating (Durapore® Millipore Corporation, Bedford, Mass.) were cut and their weight is recorded. They were then pre-wetted with water by being placed in methanol, and then soaked in MilliQ® water.

A solution was made containing the acrylamide monomers, photoinitiator, and water. The composition of this solution is shown in Table 1:

TABLE 1

| Component | Grams |
| --- | --- |
| N,N-Dimethylacrylamide (DMAm) | 1.50 grams |
| Diacetoneacrylamide (DACAm) | 1.50 |
| N,N'-Methylenebisacrylamide(MBAm) | 0.75 |
| Irgacure 2979* photoinitiator | 0.15 |
| Water | 96.1 |
|  | 100 total grams |

*Ciba-Geigy, Hawthorn, NY

After total dissolution of reactants, the solution is placed in a dish and the prewetted membranes are introduced into the solution. The dish is covered and the membranes are swirled on a Orbit shaker (LabLine Instruments, Melrose Park, Ill.) in the solution for 10 minutes. The membranes are removed and individually placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems UV exposure lab unit with an "H" bulb. Time of exposure is controlled by how fast the assembly moves through the UV unit. In this example, the assembly moves through the UV chamber at 20 feet per minute.

After emerging from the UV unit, the membranes are removed from the sandwich and immediately placed in methanol, where they are washed by swirling for 15 minutes. Next, they are washed in MilliQ® water for 15 minutes. Following this washing procedure they are allowed to air dry.

The membranes are weighed again, and the % weight add-on per membrane is calculated as the added weight divided by the initial weight multiplied by 100. For this example, the weight add-on was 4.4%.

Table 2 shows the measurements made on the membranes:

TABLE 2

| Membrane Number | Conditioning | Measurements |
| --- | --- | --- |
| One | None | Wetting time, flow time, protein binding |
| Two | Dry heat for 2 hours at 135° C. | Wetting time, protein binding |
| Three | Autoclave 1 hour at 124° C. | Wetting time, protein binding |
| Four, Five, Six | None | Total organic carbon extractables |

Relative to the phobic substrate, the modified membrane displayed a water flow time increase of 25%. The total organic carbon extractables were measured as 0.646 micrograms/square centimeter. The wetting time and protein binding are given in Table 3 below:

TABLE 3

| Membrane Number | Wetting Time (seconds) | Protein Binding ($\mu g/cm^2$) |
| --- | --- | --- |
| One | 0.2 | 14 |
| Two | 2.0 | 18 |
| Three | 0.3 | 21 |

Wetting time was measured by dropping a 47 mm disk horizontally into water and timing the appearance of complete wetting through the disk.

EXAMPLE 2

Modification of PVDF Membranes Using Different Monomers with DMAm and MBAm

PVDF membranes were modified as described in Example 1 using different monomers with DMAm and MBAm, as shown Table 4 below:

TABLE 4

| Ex. # | Monomer/ grams | Monomer/ grams | Monomer/ grams | Protein Binding as made $\mu/cm^2$ | Protein Binding after Dry Heat $\mu/cm^2$ | Protein Binding after Autoclave $\mu/cm^2$ | TOC |
| --- | --- | --- | --- | --- | --- | --- | --- |
| 2-1 | DMAm/ 2.0 | DACAm/1.0 | MBAm/ 0.75 | 15 | 20 | 26 | 0.518 |
| 2-2 | DMAm/ 2.0 | DEAm/ 1.0 | MBAm/ 0.5 | 13 | 34 | 20 | |
| 2-3 | DMAm/ 2.0 | IPAm/ 1.0 | MBAm/ 0.5 | 16 | 30 | 21 | |
| 2-4 | DMAm/ 2.0 | BACAm/1.0 | MBAm/ 0.5 | 14 | 18 | 10 | |

TABLE 4-continued

| Ex. # | Monomer/ grams | Monomer/ grams | Monomer/ grams | Protein Binding as made | Protein Binding after Dry Heat µ/cm$^2$ | Protein Binding after Autoclave µ/cm$^2$ | TOC |
|---|---|---|---|---|---|---|---|
| 2-5 | NVP/ 1.5 | DACAm/1.5 | MBAm/ 1.0 | 26 | 219 | 85 | |
| 2-6 | DMAm/ 3.0 | | MBAm/ 1.0 | 19 | 199 | 72 | 0.661 |
| 2-7 | NVP/ 1.5 | | MBAm/ 1.0 | 15 | 305 | 217 | |

EXAMPLE 3

Continuous Roll Production

Rolls of surface modified membrane were prepared by sequentially passing hydrophobic 0.1 µm pore sized membrane at various speeds through a wetting pan containing an aqueous solution composed of various concentrations of N,N-dimethylacrylamide (DMAm), N,N'-methylenebisacrylamide (MBAm), diacetoneacrylamide (DACAm), and tri(propyleneglycol)methyl ether (TPM, constant 20%), exposing to UV radiation from both sides using four Fusion UV Systems F600 lamps while sandwiched between polyethylene film, rinsing in a tank of methanol followed by a tank of water, and drying over a vacuum drum while impinging with 115° C. dry air. The various conditions employed and results are given in Table 5 below. Controls in Lines 1 and 2 are included to demonstrate the effect of mixing monomers on the thermal stability of protein binding.

TABLE 5

| % DMAm | % MBAm | % DACAm | Speed mm/sec | Water Permeability LMH/kPa | Wettability dynes/cm to wet after 2 hours 135° C. dry oven exposure | IgG Binding µg/cm$^2$ | IgG Binding after 2 hrs @ 135° C. µg/cm$^2$ | IgG Binding after 131° C. autoclave µg/cm$^2$ |
|---|---|---|---|---|---|---|---|---|
| 3.0 | 1.0 | 0.0 | 102 | 21.0 | 82 | 27.0 | 139.9 | 100.3 |
| 0.0 | 1.0 | 3.0 | 76 | | | 28.7 | 127.4 | 29.2 |
| 0.75 | 0.75 | 4.0 | 102 | 54.5 | 60 | 19.1 | 27.2 | 19.9 |
| 0.75 | 0.75 | 4.0 | 102 | 51.4 | 60 | 16.9 | 27.2 | 19.3 |
| 0.75 | 0.75 | 4.0 | 152 | 52.1 | 70 | 14.3 | 26.1 | 13.6 |
| 0.75 | 0.75 | 4.0 | 152 | 53.0 | 70 | 16.0 | 27.7 | 19.6 |
| 1.00 | 1.00 | 5.0 | 152 | 48.3 | 70 | 10.8 | 20.2 | 16.9 |
| 2.00 | 0.75 | 4.0 | 152 | 48.1 | 77 | 13.0 | 17.2 | 14.5 |
| 2.00 | 0.75 | 3.0 | 152 | 52.2 | 77 | 8.9 | 18.8 | 16.4 |
| 2.00 | 1.00 | 4.0 | 152 | 47.9 | 77 | 9.3 | 16.8 | 14.9 |

EXAMPLE 4

Results for Caustic Resistance Testing with Commercial PVDF Membranes and those of the Present Invention The ratio of Flow Times for membranes before and after exposure to 0.1 N NaOH for two hours at ambient temperature are shown in Table 6 below.

TABLE 6

| Membrane | Flow Time (sec) | Flow time after exposure (sec) | Ratio |
|---|---|---|---|
| Durapore ® | 238 | 970 | 4 |
| Fluorodyne ® 0.1 µ | 746 | 8491 | 11 |
| Fluorodyne ® 0.2 µ | 201 | 2987 | 15 |
| Present Invention | 281 | 301 | ~1 |

As discussed above, it is greatly preferred that modified membrane, such as those of the present invention, can be easily and effectively "cleaned"; i.e., subjected to a regime of post reaction washing and/or extraction steps to remove materials which could subsequently be extracted into the product being filtered. To reduce extractables to such low levels, it is necessary to have a cleaning method that will remove low molecular weight species and unreacted monomers, as well as unbound oligomers and polymeric species. This may be done by sufficiently exhaustive extraction with a liquid which will solvate these materials. There is, however, an economic price to be paid as the extraction time is increased, and it is therefore desirable that the extraction time be minimized. Moreover, it has been observed that modified membranes of the prior art do not show reduced extractables despite lengthy washing or soaking, if they are subsequently autoclaved. While not wishing to be bound by a particular theory, it is believed that this may be due to hydrolytic breakdown products of the modification resulting from autoclaving, which are extracted subsequently. It can be seen that it would be desirable to have a modified membrane or porous media that had a stable extractables level after exposure to heat, for example autoclaving, or exposure to highly alkaline liquids. It is a significant attribute of the membranes of the present invention that they can be efficiently cleaned up to very low levels of extractables, levels lower than membranes of the prior art.

FIG. 1 illustrates the results from a test to compare extractable levels of membranes of the prior art and those of the present invention. Sets of both membranes were subjected to a post-manufacturing soak at conditions designed to remove significant amounts of any extractables present. Sub-sets of each type were soaked for different times in order to determine the effect of increasing soak time on extractables removal.

Samples of commercial PVDF microporous membrane (Durapore®, Millipore Corporation, Bedford, Mass.) were soaked in 80° C. water for times as shown in FIG. 1. After each time interval, samples were removed and tested in the TOC method for determining extractables levels. FIG. 1 shows that TOC extractables are between about 2 to 5 micrograms per square centimeter. The level of extractables was unaffected by the 80° C. soak time. This indicates a limit to any improvement for these membranes.

Membranes of the present invention were soaked in methanol for times as shown in FIG. 1, and TOC extractables were determined as described above. The black squares denote Durapore® and the grey triangles, inverted triangles and circles denote independent runs of identical membranes of the invention. It can be seen that for the membranes of the invention, TOC extractables are approximately an order on magnitude lower, about 0.2 to 0.4 micrograms per square centimeter. These results show that membranes of the present invention can be made significantly cleaner than those of the prior art, and that exhaustive soaking will not lower the extractables level of membranes of the prior art to the level attainable for those of the present invention.

As discussed above, one significant problem with the membranes of the prior art is that their biomolecule resistance will significantly decrease when heated; i.e., that is, their biomolecule resistance will not be sufficiently heat stable. Dry heat has a more deleterious effect, and wet heat, as in autoclaving, has a lesser, but still substantial effect. Since membranes are subjected to various heat regimes, depending on use, these effects pose a serious drawback to commercial development.

Surprisingly, it has been discovered that the crosslinked terpolymers of the invention, and in particular the crosslinked polymers of acrylamides, do not have this sensitivity to heat. In particular, crosslinked terpolymer containing methacrylamides and containing N-vinyl pyrrolidones share this heat stability of high resistance to biomolecule sorption.

Figure 2:
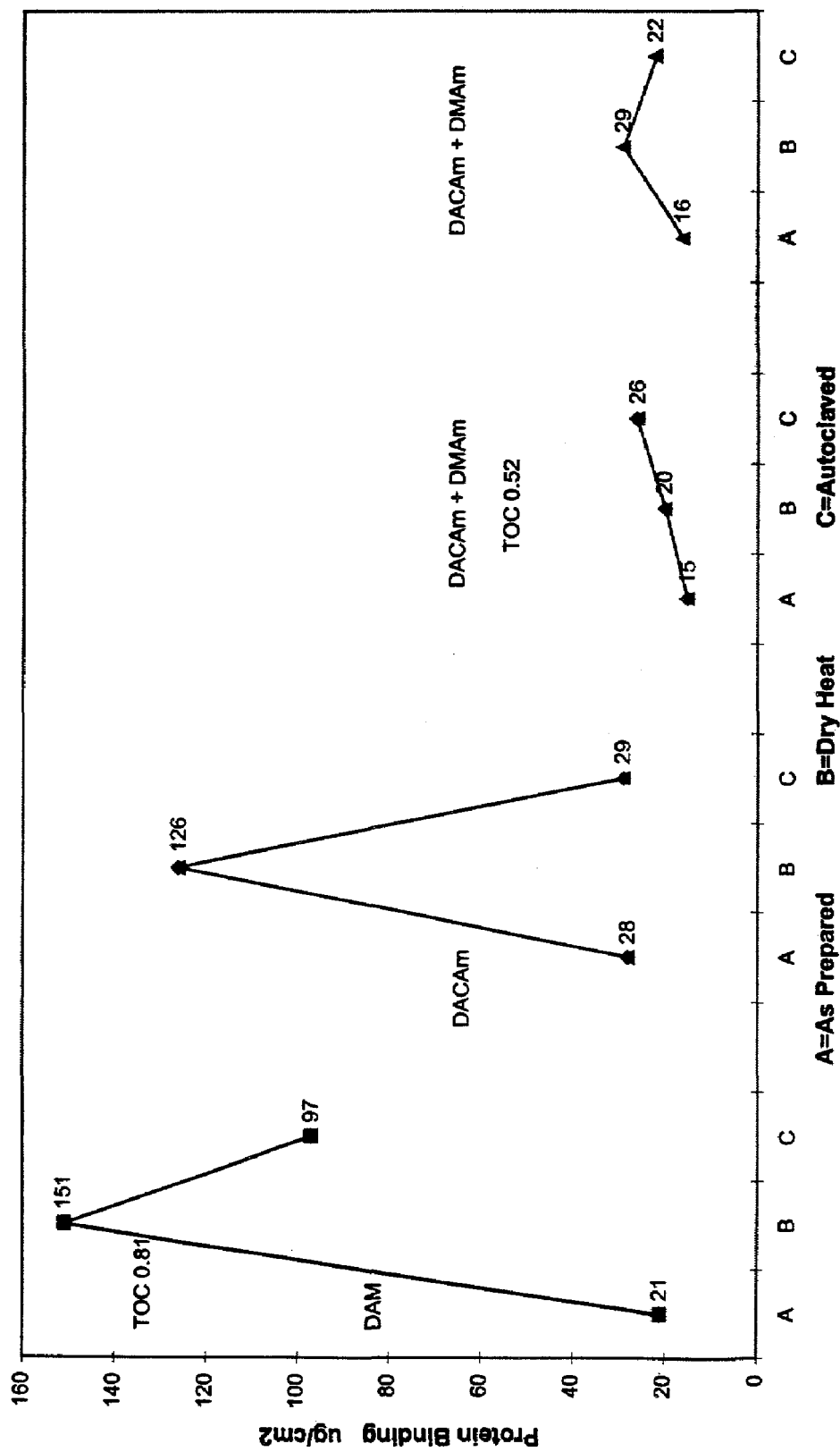
FIG. 2 illustrates the effect of heat on the resistance to biomolecule adsorption of membranes of the present invention.

FIG. 1, which illustrates the results of Example 1, clearly shows the beneficial effect of the present invention. In FIG. 2, the results from three modifications of the same base membrane are shown. Modification of two sets of samples with crosslinked polyacrylamide from a single monomer (N,N-dimethylacrylamide (DMAm) in one case and diacetone acrylamide (DACAM) in the other) and crosslinker monomer (methylene bis-acrylamide (MBAm)) have good, that is low, protein adsorption as made. When samples of these modified membranes are heated to 135° C. for two hours in an oven and then tested, protein adsorption was markedly higher, by approximately 4-10 times the as-made value. A separate sample of each was held in a 121° C. steam autoclave for one hour and then tested for protein adsorption. The DMAm sample was much higher than the as-made value, while the DACAm sample had about the same value. In sharp contrast, the membrane modified with a mixture of DMAm and DACAm monomers showed a negligible effect from the two hour 135° C. heating or the autoclaving. In addition, the as-made protein adsorption of the terpolymer modified membrane was lower than those of the single monomer modified membranes. A heat stable biomolecule resistant surface is one that has no increase or a small increase in biomolecule adsorption after heat exposure. More specifically, a heat stable biomolecule resistant surface is one which, after exposure to heat as described herein, has less than about twice the IgG adsorption of the same surface prior to heat exposure, as measured by the IgG test described herein.

A decrease in biomolecule adsorption after heat exposure may be seen due to variability in the test method when the change is inherently small. There also may be optimized formulations that will give the effect of a decrease. In the context of the present invention, biomolecule resistance is measured with the IgG test. Representative heat exposures are done with dry heat at 135° C. for 2 hours, and with wet heat at 124° C. for 1 hour. A heat stable biomolecule resistant surface is one that has less than about twice the IgG adsorption of the unexposed-to-heat surface.

Given that practitioners in the field generally attempt to maximize the hydrophilic nature of surfaces where resistance to biomolecule adsorption is desired, it is further surprising that in the Examples 2-1 to 2-7 the use of a less hydrophilic monomer with the hydrophilic dimethylacrylamide monomer gives an improvement in overall biomolecule resistance. Table 7 below gives the values of P, the octanol-water partition coefficient for representative monomers used in this invention. P equals the ratio of the concentration in the octanol phase to the concentration in the aqueous phase when a compound is subjected to an octanol-water two phase extraction. Higher values of P show a more hydrophobic compound.

TABLE 7

| Monomer Abbreviation | Monomer name | P |
|---|---|---|
| DMAm | Dimethylacrylamide | 4.57 |
| NVP | -Methyl Pyrrolidine | 3.80 |
| MBAm | N,N-Methylene bis-acrylamide | 2.63 |
| DACAm | Diacetoneacrylamide | 11.48 |
| DEAM | Diethylacrylamide | 22.39 |
| IPAm | N-Isopropylacylamide | 11.48 |
| BACAm | N-t-Butylacrylamide | 13.49 |

P values for the monomers were calculated using ChemPlus© software (HyperCube, Inc., Waterloo, Ont.). Monomer P values were then used to calculate a combined P value for the crosslinked terpolymers of Examples 1 and 3. The combined values were the sum of the mass fraction of the monomers times its P value. The combined P value is a measure of the hydrophilic nature of the resulting polymer, the higher the value, the less hydrophilic is the polymer.

Table 8 shows the combined P values, the protein binding after dry heat (2 hours at 135° C.) and after autoclave (1 Hour at 124° C. steam) exposure. In all the examples in this Table, N,N-methylene bis-acrylamide is the crosslinking monomer.

TABLE 8

| Ex. # | Combined Octanol-Water Partition Coefficient for Crosslinked Terpolymers | Protein Binding after Dry Heat µ/cm² | Protein Binding after Autoclave µ/cm² |
|---|---|---|---|
| DMAm/DACAm | 6.06 | 20 | 26 |
| DMAm/DACAm | 6.96 | 18 | 21 |
| DMAm/DEAm | 9.48 | 34 | 20 |
| DMAm/IPAm | 6.32 | 30 | 21 |
| DMAm/BACAm | 6.90 | 18 | 10 |
| DACAm/NVP | 6.38 | 219 | 85 |
| | Combined Octanol-Water Partition Coefficient for Crosslinked Single Monomer Polymers | | |
| DMAm | 4.1 | 199 | 72 |
| NVP | 3.5 | 305 | 217 |

These examples are not shown to limit this invention, but to illustrate the surprising observation that the heat stability of resistance to biomolecule adsorption, as here shown by protein binding after either dry or wet heat exposure, is improved by the incorporation of a more hydrophobic monomer into the crosslinked terpolymer. Specifically, the results show that polymers made with MBAm and DMAm bind more protein than crosslinked terpolymers made with these monomers and a more hydrophilic monomer. Similarly, a crosslinked polymer from NVP and MBAm has more binding after heat exposure than a crosslinked terpolymer made with NVP, MBAm and DACAm.

EXAMPLE 5

Comparative Example 1

Sartorius Hydrosart 0.2µ Cellulose Membrane

Hydrosart 0.2µ cellulose membrane was removed from a Sartocon stack. The ethanol was washed out with MilliQ® water. After 3 washes with excess MilliQ® water, a sample of membrane was dried and analyzed by infrared. IR and Scanning Electron Microscopy indicated the membrane was composed of regenerated cellulose on a support of cellulose paper.

Alkaline Stability

The washed, but not dried membrane was subjected to the alkaline stability test. The ratio of flow times after to before base treatment was 1.06. This indicates that, according to this criterion, the membrane is alkaline stable.

Protein Binding

The membrane was tested for protein binding using the standard IgG protocol. The values were:
As is: 183 µgrams/cm²
2 hours 135° C. dry heat: 191 µgrams/cm²
Autoclaved: 204 µgrams/cm²

Total Organic Carbon (TOC)

47 mm disks were washed for 30 minutes with MilliQ® water. The MilliQ® water was replaced, and the membranes were washed an additional 24 hours. Through each individual disk a total of 275 cc of MilliQ® water were flushed under a pressure gradient of about 13 pounds/in². These membranes were tested for TOC. Three membranes were grouped together and tested for TOC without autoclaving, and three membranes were grouped together and tested for TOC after autoclaving (the membranes of the present invention are tested for TOC after autoclaving). The experiment was repeated to confirm the results (Table 9):

TABLE 9

| Membrane | TOC before Autoclaving µ grams/cm² | TOC after autoclaving µ grams/cm² |
|---|---|---|
| Hydrosart 0.2µ MF TOC#1 | 0.25 | 5/08 |
| Hydrosart 0.2µ MF TOC#2 | 0.09 | 3.46 |

This example indicates that although Hydrosart membranes can be flushed to a low TOC value, autoclaving generates large amounts of extractables. The membranes of the current invention do not generate extractables of this magnitude after autoclaving.

EXAMPLE 6

Comparative Example 2

Sartorious Sartobran 0.2µ Cellulose Acetate Membranes

Sartobran P 0.2µ cellulose membrane was removed from a Sartocon stack. The membrane was washed with MilliQ® water. After 3 washes with excess MilliQ® water, a sample of membrane was dried and analyzed by infrared. IR and Scanning Electron Microscopy indicated the membrane was composed of cellulose acetate on a support of polyethyleneterphthalate.

Alkaline Stability

The washed, but not dried membrane was subjected to the alkaline stability test. The ratio of flow times after to before base treatment was 8.20. This indicates that, according to this criterion, the membrane is not stable to alkaline treatment.

Protein Binding

The membrane was tested for protein binding using the standard IgG protocol. The values were:
A is: 62 µgrams/cm²
2 hours 135° C. dry heat; 64 µgrams/cm²
Autoclaved: 100 µgrams/cm²

Total Organic Carbon (TOC)

47 mm disks were washed for 30 minutes with MilliQ® water. The MilliQ® water was replaced, and the membranes were washed an additional 24 hours. The membranes were tested for TOC using the standard autoclave method. This test gave a value of 2.35 µgrams/cm².

While the present invention has been illustrated in terms of porous membranes, the methods of the invention are applicable to the preparation of a variety of articles having the caustic resistant, heat stable biomolecule resistant surface described herein. Thus, in some preferred embodiments, the present invention provides methods for preparing an article having the caustic resistant, heat stable biomolecule resistant terpolymer surface described herein. In some embodiments, the methods comprise contacting the surface of the article with a reactant solution containing:

(1) at least two monofunctional monomers selected from the group consisting of acrylamides, methacrylamides, and N-vinyl pyrrolidones; and (2) at least one polyfunctional monomer selected from the group consisting of polyfunctional acrylamides, polyfunctional methacrylamides and diacroylpiperazines;

said solution optionally further comprising one or more polymerization initiators;

polymerizing said monomers to form the heat stable biomolecule resistant surface on the surface of the article, and optionally washing the article.

Those of skill in the art will appreciate that the invention will have wide applicability in, for example, the biotechnology industry, for example in equipment that comes into contact with biological solutions.

HMDAA EXAMPLES

A mixed acrylamide formulation used to surface modify a 0.2μ hydrophobic PVDF Durapore membrane was altered by stepwise replacement of components with HMDAA ($R_1$ and $R_2$=$CH_2OH$). The formulations are shown below in Table 10:

TABLE 10

| Formulation | DMAm | DACAm | MBAm | HMDAA |
|---|---|---|---|---|
| Control | 2.25 | 2.25 | 0.75 | 0 |
| 1 | 2.25 | 2.025 | 0.75 | 0.225 |
| 2 | 2.25 | 1.125 | 0.75 | 1.125 |
| 3 | 2.25 | 0 | 0.75 | 2.25 |
| 4 | 2.25 | 2.25 | 0.675 | 0.075 |
| 5 | 2.25 | 2.25 | 0.375 | 0.375 |
| 6 | 2.25 | 2.25 | 0 | 0.75 |

Formulations 1-3 show replacement of DACAm at 10, 50 and 100%, while formulations 4-6 show the replacement of MBAm at 10, 50 and 100%. Wettability and protein binding were tested (a) as formed; (b) dry heated at 135° C., and (c) autoclaved.

Relative to control, all test membranes better wetting after dry heat. The dry heated control wet slowly over 2 minutes, while the test samples wetted at times from 1 to 10 seconds. Thus, even a 10% replacement of either DACAm or MBAm resulted in enhanced dry wettability.

Formulation 6 contains no MBAm, but still showed a weight percent add-on of more than 4%, thus confirming HMDAA as a crosslinking agent that imparts enhanced wettability.

Figure 3:
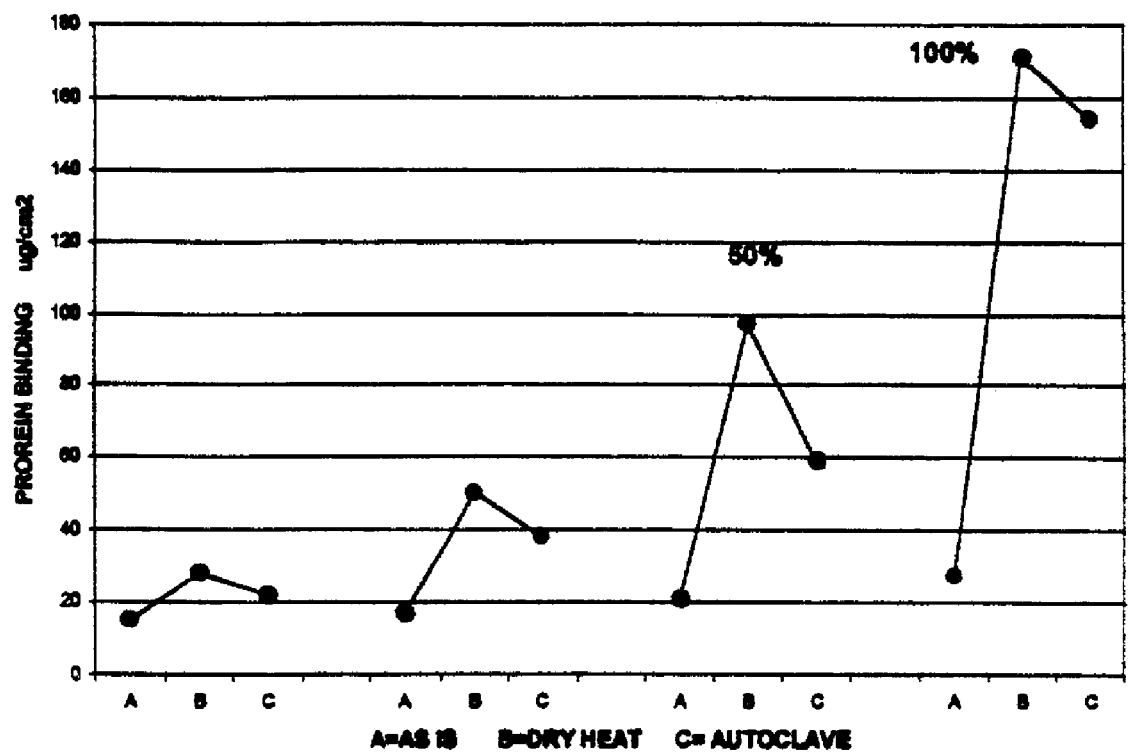
FIG. 3 shows the protein binding of membranes having surface coatings where HMDAA has been substituted in stepwise fashion for DAA.
Figure 4:
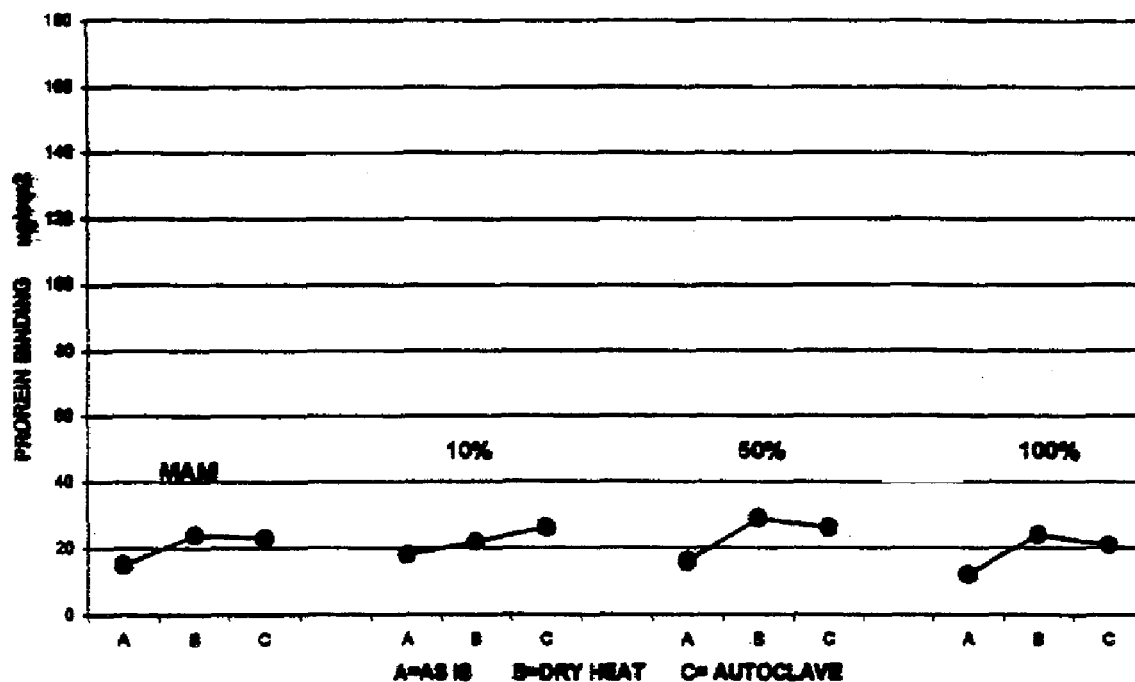
FIG. 4 shows the protein binding of membranes having surface coatings where HMDAA has been substituted in stepwise fashion for MBAm.

Protein binding experiments showed that the "as formed" protein binding of all membranes were low. Removing DACAm from the formulation results in high dry heat protein binding. When DACAm is present at 2.25%, however, all membranes show low binding after dry heat. The results are shown in FIGS. 3 and 4.

The reference works, patents, patent applications, and scientific literature, and other printed publications that are mentioned of referred to herein are hereby incorporated by reference in their entirety.

As those skilled in the art will appreciate, numerous changes and modifications may be made to the preferred embodiments of the invention without departing from the spirit of the invention. It is intended that all such variations fall within the scope of the invention.

What is claimed is:

1. A clean, caustic resistant, porous membrane comprising a microporous membrane substrate and a heat stable biomolecule resistant surface, wherein said heat stable biomolecule resistant surface is a separately formed surface coating which comprises a crosslinked terpolymer, said terpolymer comprising at least two monofunctional monomers selected from the group consisting of acrylamides, methacrylamides, and N-vinyl pyrrolidones, and at least one polyfunctional monomer selected from the group consisting of polyfunctional acrylamides, polyfunctional methacrylamides, and diacroylpiperazines;

wherein said surface coating is formed in situ on said membrane substrate by a method comprising exposing said monomers to heat, ultraviolet light or electron beam;

provided that when said monofunctional monomer comprises an acrylamide that comprises diacetone acrylamide, said diacetone acrylamide is present in an amount of no more than 37.5% by weight of said surface.

2. The membrane of claim 1 wherein said crosslinked terpolymer comprises at least one monofunctional monomer that is an acrylamide, wherein the acrylamide nitrogen of said acrylamide is substituted with at least one gem dialkyl substituted carbon.

3. The membrane of claim 1 wherein said crosslinked terpolymer is a copolymer formed from methylene-bis-acrylamide, N-vinyl pyrrolidone, and either of dimethylacrylamide or diacetone acrylamide.

4. The membrane of claim 1 wherein said microporous membrane substrate is formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride.

5. The membrane of claim 4 wherein said crosslinked terpolymer comprises at least one monofunctional monomer that is an acrylamide, wherein the acrylamide nitrogen of said acrylamide is substituted with at least one gem dialkyl substituted carbon.

6. The membrane of claim 4 wherein said crosslinked terpolymer is a copolymer formed from methylene-bis-acrylamide, N-vinyl pyrrolidone, and either of dimethylacrylamide or diacetone acrylamide.

7. The membrane of claim 4 wherein the crosslinked terpolymer further comprises a supplemental property modifying monomer.

8. The membrane of claim 7 wherein said supplemental property modifying monomer is selected from the group consisting of (3-(methacryloylamino) propyl)trimethylammonium chloride, (3-acrylamidopropyl) trimethylammonium chloride, 2-acrylamido-2-methyl-1-propanesulfonic acid and aminopropylmethacrylamide.

9. The membrane of claim 4 wherein two of said monofunctional monomers are present in the ratio of about 1 to about 5 by weight.

10. The membrane of claim 4 wherein two of said monofunctional monomers are present in the ratio of about 1 to about 2.

11. The membrane of claim 4 wherein the total amount of said monofunctional monomers present is from about 0.5% to about 20% by weight.

12. The membrane of claim 4 wherein the total amount of said monofunctional monomers present is from about 2% to about 10%.

13. The membrane of claim 4 wherein the total amount of said monofunctional monomers present is from about 4% to about 8% by weight.

14. The membrane of claim 4 wherein the ratio of the total amount of monofunctional comonomers to polyfunctional crosslinker monomer is about 1 to about 10 by weight.

15. The membrane of claim 4 wherein the ratio of the total amount of monofunctional comonomers to polyfunctional crosslinker monomer is about 2 to about 6 by weight.

16. The membrane of claim 4 wherein the heat stable biomolecule resistant surface is hydrophilic.

17. A clean, caustic resistant, porous membrane comprising a microporous membrane substrate and a heat stable biomolecule resistant surface, wherein said heat stable biomolecule resistant surface is a separately formed surface coating which comprises a crosslinked terpolymer, said crosslinked terpolymer is a copolymer formed from dimethylacrylamide, diacetone acrylamide, and methylene-bis-acrylamide; provided that diacetone acrylamide is present in an amount of no more than 37.5% by weight of said surface;

wherein said surface coating is formed in situ on said membrane substrate by a method comprising exposing said monomers to heat, ultraviolet light or electron beam.

18. A clean, caustic resistant, porous membrane comprising a microporous membrane substrate and a heat stable biomolecule resistant surface, wherein said heat stable biomolecule resistant surface is a separately formed surface coating which comprises a crosslinked terpolymer, said crosslinked terpolymer is a copolymer formed from dimethylacrylamide, diacetone acrylamide, and methylene-bis-acrylamide; provided that diacetone acrylamide is present in an amount of no more than 37.5% by weight of said surface;

wherein said surface coating is formed in situ on said membrane substrate by a method comprising exposing said monomers to heat, ultraviolet light or electron beam;

wherein said microporous membrane substrate is formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride.

19. A clean, caustic resistant, porous membrane comprising a polyvinylidene difluoride microporous membrane substrate and a heat stable biomolecule resistant surface, wherein said heat stable biomolecule resistant surface is a separately formed surface coating which comprises a crosslinked terpolymer, said crosslinked terpolymer being a copolymer formed from either:

(a) methylene-bis-acrylamide, dimethylacrylamide, and diacetone acrylamide; or (b) methylene-bis-acrylamide, N-vinyl pyrrolidone, and either of dimethylacrylamide or diacetone acrylamide;

said terpolymer being formed by a method comprising use of heat or ultraviolet light to produce said terpolymer; and said diacetone acrylamide being present in an amount of no more than 37.5% by weight of said surface.

20. The membrane of claim 19 wherein said crosslinked terpolymer is a copolymer formed from methylene-bis-acrylamide, N-vinyl pyrrolidone, and either of dimethylacrylamide or diacetone acrylamide.

21. The membrane of claim 19 wherein said heat stable biomolecule resistant surface is a separately formed surface coating; said surface coating comprising a crosslinked terpolymer; said crosslinked terpolymer comprising:

at least one polyfunctional monomer selected from the group consisting of polyfunctional acrylamide monomers, polyfunctional methacrylamide monomers, and diacroylpiperazines; and at least two different monofunctional monomers selected from the group of N-vinyl pyrrolidone monomers and monomers having the formula:

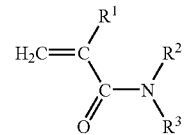

wherein:

$R^1$ is —H or $CH_3$, $R^2$ is H or $C_1$-$C_6$, preferably $C_1$-$C_3$ alkyl, either linear or branched, $R^3$ is H or $C_1$-$C_6$, preferably $C_1$-$C_3$ alkyl, either linear or branched, or $C(CH_3)_2CH_2C(=O)CH_3$, or $(P=O)((NCH_3)_2)_2$, or $C=ON(CH_3)_2$, or $CH_2$—O—$R^4$, where $R^4$ is $C_1$-$C_5$ alkyl, either linear or branched, or $(CH_2$-$CH_2$—O)n-$R^5$, where $R^5$ is —H or —$CH_3$, and n=2 or 3; provided that $R^2$ and $R^3$ are not simultaneously H.

22. A clean, caustic resistant, porous membrane comprising a polyvinylidene difluoride microporous membrane substrate and a heat stable biomolecule resistant surface, wherein said heat stable biomolecule resistant surface is a separately formed surface coating which comprises a crosslinked terpolymer, wherein said crosslinked terpolymer is a copolymer formed from methylene-bis- acrylamide, dimethylacrylamide, and diacetone acrylamide;

said diacetone acrylamide being present in an amount of no more than 37.5% by weight of said surface;

said terpolymer being formed by a method comprising use of heat or ultraviolet light to produce said terpolymer.

23. A clean, caustic resistant, porous membrane comprising a microporous membrane substrate and a heat stable biomolecule resistant surface, wherein said heat stable biomolecule resistant surface is a separately formed surface coating which comprises a crosslinked terpolymer, said terpolymer being a copolymer formed from dimethylacrylamide, diacetone acrylamide, and methylene-bis-acrylamide; said diacetone acrylamide being present in an amount of up to 37.5% by weight of said surface.

24. The membrane of claim 23 wherein said microporous membrane substrate is formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride.

25. A clean, caustic resistant, porous membrane comprising a microporous membrane substrate and a heat stable biomolecule resistant surface, wherein said heat stable biomolecule resistant surface is a separately formed surface coating which comprises a crosslinked terpolymer, said terpolymer being a copolymer formed from methylene-bis-acrylamide, N-vinyl pyrrolidone, and either of dimethylacrylamide or diacetone acrylamide; provided that when said surface comprises diacetone acrylamide, said diacetone acrylamide is present in an amount of no more than 37.5% by weight of said surface.

26. The membrane of claim 25 wherein said microporous membrane substrate is formed from one or more of the group consisting of aromatic sulfone polymers, polytetrafluoroethylene, perfluorinated thermoplastic polymers, polyolefin polymers, ultrahigh molecular weight polyethylene, and polyvinylidene difluoride.

* * * * *